United States Patent
Narang et al.

[11] Patent Number: 5,980,813
[45] Date of Patent: Nov. 9, 1999

[54] RAPID PROTOTYPING USING MULTIPLE MATERIALS

[75] Inventors: Subhash C. Narang, Palo Alto; Susanna C. Ventura, Los Altos; Sunity Sharma, Fremont; John S. Stotts, Santa Clara, all of Calif.

[73] Assignee: SRI International, Menlo Park, Calif.

[21] Appl. No.: 09/105,858

[22] Filed: Jun. 26, 1998

Related U.S. Application Data

[63] Continuation-in-part of application No. 08/844,090, Apr. 17, 1997, abandoned.

[51] Int. Cl.$^6$ .......................... B29C 35/08; B29C 41/02
[52] U.S. Cl. .................. 264/401; 264/308; 264/494; 264/497; 419/13; 419/14; 419/15; 419/19; 419/45; 419/61
[58] Field of Search .................... 264/308, 401, 264/494, 497; 419/13, 14, 15, 19, 45, 61

[56] References Cited

U.S. PATENT DOCUMENTS

| | | | |
|---|---|---|---|
| 5,427,733 | 6/1995 | Benda et al. | 419/1 |
| 5,573,721 | 11/1996 | Gillette | 264/401 |

FOREIGN PATENT DOCUMENTS

| | | | |
|---|---|---|---|
| 5-311207 | 11/1993 | Japan | 264/401 |

*Primary Examiner*—Leo B. Tentoni
*Attorney, Agent, or Firm*—Robert D. Fish; Crockett & Fish

[57] ABSTRACT

Novel compositions and methods are provided for use in the stepwise, layer by layer fabrication of three-dimensional objects, in which a build material contains a metal having a covalent bond to a non-metal, and the layers are processed to produce the three-dimensional object at least in part through a chemical reaction which alters the covalent bond of the metal. In a first aspect of the invention the build material includes a metal that is covalently bound to a polymeric precursor. In another aspect of the invention, the build material includes a metal, Me, that is covalently bound to a first ligand, $L_1$. Following deposition of the build material, the first ligand undergoes a redox reaction with a second ligand, $L_2$, thereby breaking the covalent bond of the metal. In more preferred embodiments of this class, $L_1$ and $L_2$ react to form a gas, and the metal reacts to form an oxide such as $MeSO_x$, $MeNO_x$, $MeCO_x$ and so forth. In yet another aspect of the invention, multiple build materials are employed to provide non-uniformities such as electrical, thermal, and magnetic conduction paths, structural supports, chemical and wear resistant areas, and so forth.

25 Claims, 3 Drawing Sheets

RAPID PROTOTYPING USING MULTIPLE MATERIALS

This application is a continuation-in-part of application Ser. No. 08/844,090 filed Apr. 17, 1997, now abandoned.

REFERENCE TO GOVERNMENT GRANT

This invention was made with Government support under Contract Number N00014-95-C-0019, awarded by the Office of Naval Research. The Government has certain rights in this invention.

TECHNICAL FIELD

The present invention relates generally to automated layered production of three-dimensional objects.

BACKGROUND

Conventional techniques for mass producing three-dimensional objects typically include casting, deforming, machining and assembling. While such techniques are capable of producing complicated objects in high volume at relatively low cost, they are often poorly adapted for rapid prototyping, and for relatively short production runs.

Direct CAD Manufacturing systems (DCM) are somewhat better adapted to rapid prototyping. In DCM systems computers are employed to produce a three-dimensional model of a desired object, and then to drive servo-mechanisms which produce the desired object. This generally involves machining or application of other subtractive processes on a starting block of material. Subtractive DCM has proven to be cost effective in automotive, aerospace, appliance, toy manufacturing, and many other industries that involve repeated design and prototyping of parts. Such systems, however, are not well suited to producing prototypes having complicated internal construction. This is a natural function of starting the process with a substantially solid block of material, and machining the part from the outside.

Additive DCM systems address this problem by producing a three-dimensional object from a large number of individual layers. The layers can be machined in the normal fashion and then pinned, welded or otherwise held together, or they can be deposited one on top of the other through deposition of a flowable build material. The latter systems are generically referred to herein as Sold Freeform Fabrication (SFF) systems.

In SFF systems each layer is typically only about 0.1 to 0.25 mm. thick. This provides about 40 to 100 layers for each cm of object, and allows SFF systems to produce objects having complicated internal structure. While SFF systems may not have yet be able to produce objects having exactly the same shape achievable with other methods, they are generally able to produce "near net shape" objects, i.e., those having substantially the end-shape desired, and which can then be readily finished by conventional processing steps. For convenience in the descriptions herein, the term "object" is employed to mean both the final object and any intermediate near net shaped object. In a similar manner, the terms "fabricate" and "fabricating" are used herein to include both production of a final product from a starting material, and production of a recognizable intermediate. Thus, a "method for fabricating a three-dimensional object "may involve merely producing an intermediate that is visibly similar to the finished object or product, but which requires additional processing to arrive at the finished object or product.

In addition to producing fairly complicated objects, SFF systems may advantageously employ multiple deposition heads to deposit a plurality of different materials. U.S. Pat. Nos. 4,999,143 and 5,569,349 (October 1996) to Almquist et al., for example, describe depositing both a build material and a supporting material in a series of layers. Moreover, while there is little or no enablement in this area, it has also been suggested that different build materials can be employed within a single layer to produce an electrically conductive path.

In SFF systems it is generally desirable to harden or otherwise cure the flowable build material deposited at each layer according to a pattern that matches a corresponding cross-section of the object being produced. While numerous different systems and methods have been proposed, there are conceptually only two classes of methods for hardening the layers in predetermined patterns—selective deposition and selective curing. In selective deposition methods, the build material is laid down from the outset in the desired pattern, and then typically cured via cooling or polymerization. Suitable apparatus for this class of methods necessarily involves some sort of delivery dispenser that is moveable with respect to the rest of the build. Examples of such delivery dispensers are the extrusion head of U.S. Pat. No. 4,749,347 to Valavaara, and the droplet emitting head of U.S. Pat. No. 4,665,492 to Masters.

In selective curing methods, the build material is deposited across an entire surface, or throughout an entire volume, and then energy is imparted to selected portions of the build material to produce the desired pattern. At some point in the process the non-cured material is then washed or brushed away. Light energy is typically employed to produce the desired pattern, and many extant systems employ one or more laser beams to trace out the desired images in the deposited build material. Lasers have been employed in this manner for laser sintering of build materials containing a metal, a metal containing powder, or a plastic, as described in U.S. Pat. No. 4,752,352 to Feygin, U.S. Pat. No. 4,863,538 to Deckard and U.S. Pat. No. 4,938,816 to Beaman et al. It is also known to apply light energy to the deposited build material in a pattern that corresponds to an entire cross-sectional image. This method is generally referred to as sterolithography, and various embodiments are described in U.S. Pat. Nos. 4,929,402 and 5,236,637 to Hull, and U.S. Pat.

Nos. 4,961,154 and 5,031,230 to Pomerantz et al.

In the last several years advances in SFF systems have driven a demand to provide functional properties in SFF produced objects that are comparable to those of conventionally produced objects. Among other things, manufacturers have expressed a desire to provide SFF produced objects that have the strength and crack resistance approaching that of forged metal components. A desire has also been expressed to provide SFF objects that include conducting paths, such as electrical, thermal or magnetic conduction paths.

Sinterable metals, alloys and ceramics can be used to produce final products having excellent structural strength, (see e.g., U.S. Pat. No. 5,496,892 to Quadir et al., and U.S. Pat. No. 4,906,424 to Hughes et al.). But these materials are generally unsuitable as build materials in SFF systems because they become fluid only at high temperatures or pressures. This creates considerable difficulties in handling and deposition, among other things by limiting the rate at which new layers can be applied to a build. The problem can be resolved to some extent by ejecting small particles or droplets from a dispenser rather than extruding relatively larger masses, but operating conditions are still severe, and generally unsuited for many applications. The problem can be resolved somewhat further by using an electrorheological support during the deposition process, as taught in U.S. Pat. No. 5,362,427 to Mitchell (November 1994), but that solution adds yet additional complications. In any event, the extreme deposition conditions presently required for depositing metal and alloy build materials in SFF systems largely preclude the inclusion of plastics or other materials during the build process, which all but eliminates the inclusion of many desirable functional properties in SFF products.

Metal containing powders such as aluminum oxide, zirconium silicate, fused silica, and silicon carbide are relatively easy to deposit, such as by the slurry droplet method of U.S. Pat. No. 4,665,492 to Masters (May 1987), but are difficult to bind together to provide adequate strength. Among other things cracking is a serious problem. Low temperature sintering can be used to ameliorate this problem to some extent, but requires inordinate amounts of time. High temperature sintering can also be used, but requires difficult or adverse conditions, and is only moderately effective. Binders can also be used to increase inter-particle strength, as described in U.S. Pat. No. 5,660,621 to Bredt (August 1997), but SFF processes using extant binders still tend to provide only relatively weak structures.

Polymerizable build materials are easier to handle and deposit, but generally provide poor structural strength. Such materials are also not known to provide the many functional qualities that may be desired. In addition, the form energy used to initiate polymerization may itself be problematic. Many photopolymers, for example, utilize UV radiation which can cause injury. Still further, the time required for the photopolymers to solidify upon exposure to UV radiation can be prohibitively long, thereby inordinately increasing the build time.

Waxes, thermosetting and thermoplastic materials, two-part epoxies, foaming plastics, and glass have also all been used in conjunction with SFF. These materials, however, are usually quite weak, and suffer from many of the same problems described above.

Thus, there is still a need to provide novel build material compositions and methods for use in the solid free-form fabrication of three-dimensional objects.

SUMMARY OF THE INVENTION

The present invention provides compositions and methods for use in the stepwise, layer by layer fabrication of three-dimensional objects, in which a build material contains a metal having a covalent bond to a non-metal, and the layers are processed to produce the three-dimensional object at least in part through a chemical reaction which alters the covalent bond of the metal.

In a first major class of preferred embodiments, the build material includes a metal that is covalently bound to a polymeric precursor. The precursor is polymerized, and at least some of the non-metallic component of the polymer is burned away, or otherwise removed during subsequent processing in such a manner that the covalent bond of the metal is broken. In more preferred embodiments of this class, a ligand is also bound at some point to the polymer or a polymer precursor, both the metal and the ligand are freed during the subsequent processing, and the metal becomes bound to the ligand.

In another major class of preferred embodiments, the build material includes a metal, Me, that is covalently bound to a first ligand, $L_1$. Following deposition of the build material, the first ligand undergoes a redox reaction with a second ligand, $L_2$, thereby breaking the covalent bond of the metal. In more preferred embodiments of this class, $L_1$ and $L_2$ react to form a gas, and the metal reacts to form an oxide such as $MeSO_x$, $MeNO_x$, $MeCO_x$ and so forth. In still more preferred embodiments the build material includes several metal species that are covalently bound to ligands, giving rise to several redox reactions and producing mixed metal products.

In yet another aspect of the invention, multiple build materials are employed in building the three-dimensional object. The various build materials are selected and deposited in a manner which produces functional non-uniformities. Preferred non-uniformities include electrical, thermal, and magnetic conduction paths, structural supports, chemical and wear resistant areas, and so forth.

Various objects, features, aspects and advantages of the present invention will become more apparent from the following detailed description of preferred embodiments of the invention, along with the accompanying drawing.

DETAILED DESCRIPTION

Figure 1:
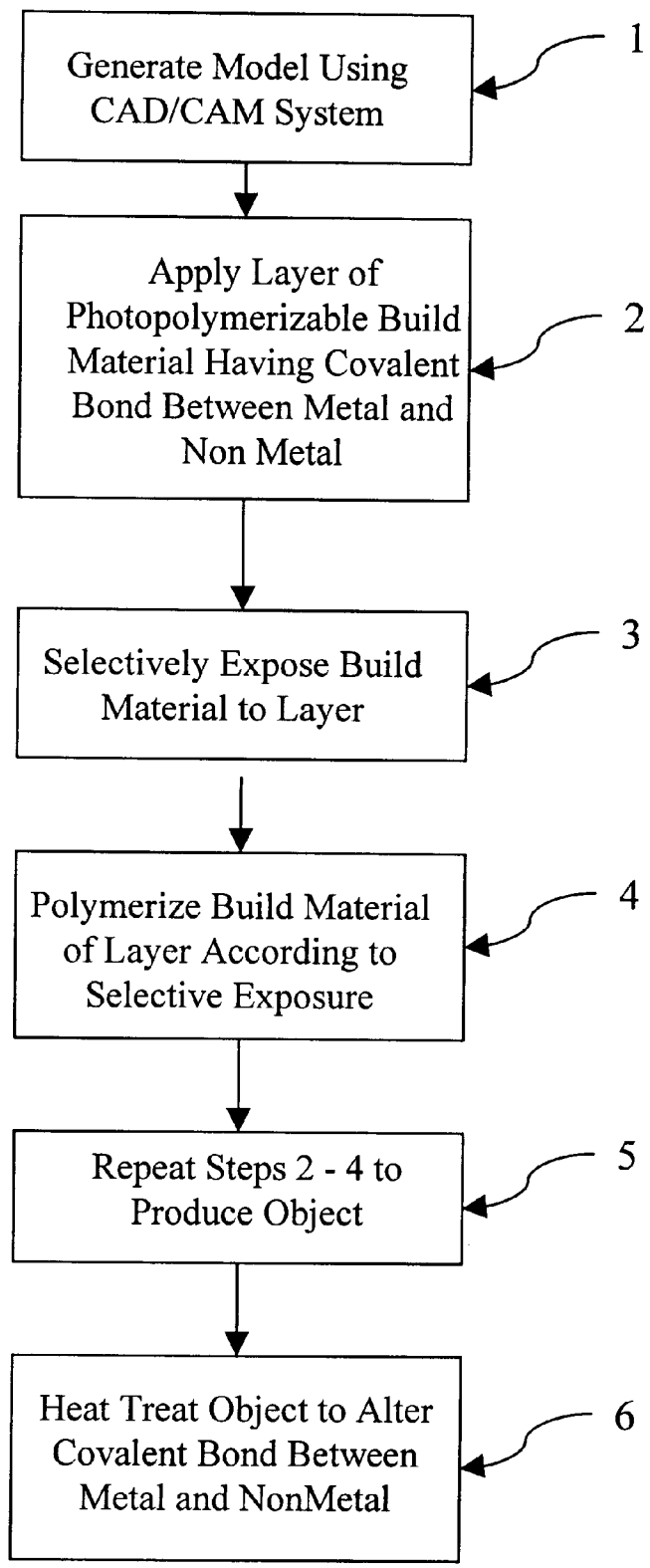
FIG. 1 is a block diagram of a method for fabricating a three-dimensional object according to a selective curing aspect of the present invention.

The practice of the present invention can employ, unless otherwise indicated, conventional techniques of photochemistry, ceramic chemistry, polymer chemistry, and rapid prototyping and manufacturing that are within the skill of the art. See, e.g., Kirk, *Encyclopedia of Chemical Technology*, Burns *Automated Fabrication* (PTR Prentice Hall, Englewood Cliffs, N.J. (1993)), and Jacobs, *Rapid Prototyping and Manufacturing: Fundamentals of Stereolithography* (Society of Manufacturing Engineers, Dearborn, Mich. (1992)). All patents, patent applications, publications and other types of references cited herein, whether supra or infra, are hereby incorporated by reference in their entirety. Despite the incorporation of references, the present text does not necessarily adopt the definitions and usages set forth in the references. Therefore, to clarify the definitions and usages of specific terms that are not defined elsewhere herein, we set forth the following.

The singular forms "a," "an" and "the" are used herein to include the plural unless the content clearly dictates otherwise. Thus, for example, reference to "a ceramic powder" includes mixtures of such powders, reference to "a polymerizable monomer" includes more than one such monomer, reference to "a layer" includes more than one layer, and the like.

The term "three-dimensional object" is used herein to mean any structure that substantially retains its intended function and shape when removed from an external support. Thus, a thin film such as that deposited on a piece of glass is generally considered herein not to be a three-dimensional object because it tends to lose its intended functionality and/or shape as it chips or peels away from the glass. A thick film such a sheet of aluminum foil, on the other hand, is considered herein to be a three-dimensional object because it retains it shape and function long after it is removed from any roller or other external support employed during its production.

The term "CAD" is used herein in its broadest sense to include all manner of computer aided design systems, including pure CAD systems, CAD/CAM systems, and the like, provided that such systems are used at least in part to develop or process a model of a three-dimensional object.

The term "build material" is used herein to mean any material that is deposited in a layer-by-layer fashion to construct the three-dimensional object. This definition expressly excludes structures that are not added in a layer-by-layer fashion, such as central or peripheral supports that may be incorporated during some aspect of the fabrication process. As taught herein, multiple build materials may be included in the fabrication of a single three-dimensional object, to form support structures, conductive paths, and so forth.

The term "metal" is used herein to mean an element selected from one of the metal and transition metal groups of the periodic table. Since metals can be present in many different forms, however, the form of the element is determined by the context. Thus, when referring to "metals and alloys", the term metal means a composition consisting substantially of metal and transition metal elements. When referring to "metal and alloy composites", the term metal means a composition consisting substantially of one or more metal and transition metal elements, along with some non-metallic composition such as a ceramic. When referring to metals having a covalent bond, the term metal means an element selected from one of the metal and transition metal groups, and which is covalently bound to a non-metal.

The term "covalent bond" is used herein to mean any chemical bond other than a purely ionic bond. Covalent bonds thus include ordinary organic bonds such as the carbon-hydrogen and carbon-oxygen bonds in a sugar, and also include the metal-ligand bonds in a coordination complex, such as $NiCl_2$ $(pyridine)_4$.

The term "successive layers" is used herein to mean layers of build material which are sequentially deposited on a build. It is not necessary that a previous layer be completely solidified or otherwise cured before the subsequent layer is added, and indeed it is generally advisable that the subsequent layer is added before the previous layer is fully cured. This improves inter-layer bonding. On the other hand, if a layer of build material is deposited on the build, and then additional build material is added before any substantial curing of the previously deposited material takes place, then both the previously deposited and additionally deposited build material are considered herein to comprise the same layer.

The term "cross-sectional pattern" is used herein to mean a representation of a cross-section of the object being built. Generally speaking, the cross-sectional pattern will be a complete vertical cross-section, because most builds are contemplated to be produced one complete layer at a time, in a vertical, stepwise fashion. Nevertheless, it is also contemplated partial cross-sections could be employed, such as to accommodate different build materials. In addition, it is contemplated that non-vertical cross-sections could be employed, so that the object being build would be constructed sideways, or in some other non-vertical manner. Non-vertical builds might, for example, be employed advantageously to provide extra strength in a particular direction.

"Visible light" is electromagnetic radiation with wavelengths ranging from $4 \times 10^3$ Å to about $7.7 \times 10^3$ Å "Near infrared light" or "near IR light" is electromagnetic radiation with wavelengths ranging from $7.5 \times 10^3$ Å to about $30 \times 10^3$ Å. "Actinic radiation" is radiation capable of initiating photochemical reactions.

Turning now to FIG. 1, a flow chart illustrates steps that may advantageously be used to produce a three-dimensional object using SFF techniques according to the present invention. In step 1, a computer representation or "model" of the object to be formed is generated using a CAD/CAM software system. The software then preferably generates an STL file, and the STL file is converted into "slice" data corresponding to vertical cross-sectional patterns of the object. Of course, the CAD model need not be a perfect representation of the object, and the slice data and cross-sectional patterns need not be perfect representations of the CAD model. Instead, each of these need only be "derived" in part from its source. It is particularly contemplated, for example, that dimensions may be scaled to produce a scaled-up or scaled-down product, or to compensate for shrinkage or other processing factors. As another example, it may be preferable to compensate for the change in distance from the light source to the uppermost layer of build material as the build grows by modifying the projected image, rather than moving either the build or the light source.

In step 2, a layer of a photopolymerizable build material is applied to either a work surface or to a previous layer. The build material is leveled to a desired thickness that corresponds to the thickness of the "slice" generated by the computer. At least one build material employed in all contemplated embodiments of the present invention includes a metal having a covalent bond to a non-metal.

It is particularly contemplated that multiple build materials may be employed in a given layer, or different build materials employed from layer to layer. This may be accomplished using multiple deposition heads, or a single deposition head through which multiple materials flow. Manifolds which can be used for this purpose are known in the art.

Presently preferred build materials suitable for the bulk of the product being produced include polymerizable silazane, silane, borazine, borane oligomers, and other preceramic monomers, oligomers or polymers functionalized by polymerizable groups (e.g., vinyl, acrylate, methacrylates, and so on); metal acrylates, metal methacrylates and other polymerizable metal carboxylates; metal carboxylate in the presence of oxidizing species and metal nitrates in the presence of reducing species. Such materials are selected because of their ability to be chemically transformed into ceramics, such as metal nitrides, carbides or oxides, or metals by heating and for some of them, because of their ease of polymerization. These build materials may or may not be used in combination with other curable monomers or oligomers. Among other suitable build materials, it is contemplated that copper formate and gold acetate-isobutyrrate would be particularly well suited for providing an electrical conduction path, silver acrylate and Pd(CHOCOO)($CH_2OHCOO$) would be particularly well suited for providing a thermal conduction path, silazanes and silanes would be particularly well suited for providing structural support, and zirconium and aluminum acrylates would be particularly well suited for providing thermal barrier coatings and a surface compressive stress layer. Additionally, layers containing these and other materials may advantageously have different coefficients of thermal expansion than other layers.

In step 3, appropriate slice data from step 1 is fed to a selective photoexposure device, which in turn exposes the layer of build material deposited in step 2 with a suitable actinic radiation according to the corresponding cross-sectional pattern derived from the CAD model. Here again, it should be cautioned that a perfect correlation between the exposure pattern and the computer generated cross-sectional pattern need not be followed. Hence, the term "according to the corresponding cross-sectional pattern" includes both more and less accurate correlations between the exposure pattern and the corresponding cross-sectional pattern.

Appropriate intensity and duration of the exposure is contemplated to be established experimentally. Nevertheless, it may be understood that suitable values for these parameters will vary as a function of numerous factors, including the nature of the monomers or other polymerizable material, the amount and activity of the photoinitiator, and the thickness and transparency of each layer to the radiation. Our experiments have demonstrated that it is desirable for each layer to be cured to a tacky point before adding the next sequential layer. This provides a suitable hardness, while still permitting adequate bonding between adjacent layers. Specific exposure parameters are given below, but in general it is contemplated that intensity will be about 20 mW per $cm^2$ (in correspondence to the wavelength at which the photoinitiator has maximum absorbance) at the surface of the uppermost layer, and that intensity will be maintained from about five seconds to about sixty seconds.

The selective photoexposure device preferably comprises a DLP or LCD desktop projector. Alternatively, the selective photoexposure device comprises a source of actinic radiation and a computer generated mask displayed on an LCD panel, that allows actinic radiation to pass therethrough in areas corresponding to areas of the photopolymerizable build material to be solidified. The mask blocks the passage of radiation from areas of the layer not to be solidified. In yet a different embodiment, the selective photoexposure device comprises scanning layer optics.

In step 4, the build material is polymerized upon exposure to the actinic radiation to form a polymer having shaped according to the corresponding computer-generated cross-sectional pattern. section., as in step 4, the photopolymerizable build material. After the formation of a layer, the process is repeated as outlined in step 5 to form additional layers over each previously formed layer until the object is fabricated.

In step 5, steps 2 through 4 are repeated to gradually build up the object desired. Depending on the number of layers the entire process may take several hours, or even several days, and may involve up to 5,000 layers or more.

In step 6, the object is removed from the build apparatus and heated to remove at least a large percentage of the organics. Heating may take place in a standard processing oven, or may occur in an alternative oven such a microwave oven. In general, it is contemplated that the object will be heated to between about 100 ° C. and about 350 ° C., for between about a few seconds and about 48 hours. Once again, the temperature and heating period may be derived experimentally. During heating it is contemplated that the covalent bonding of at least one species of metal in at least one build material will be broken. A new covalent bond involving the s metal may or may not be formed. For example, build material such as Pd(CHOCOO) ($CH_2OHCOO$) decomposes at 350° C. leaving a relatively pure form of palladium metal. In contrast, build material such as

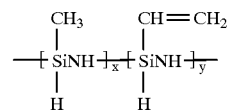

and the correspondent polymer are burned at about 450° C. to 550° C. to drive away the organics of such polymers, leaving a relatively pure form of silicon nitride, and build materials such as lead acetate, zirconium nitrate, and titanium acetylacetonate decompose between about 350° C. and about 600° C. leaving a relatively pure form of lead zirconate titanate.

Figure 2:
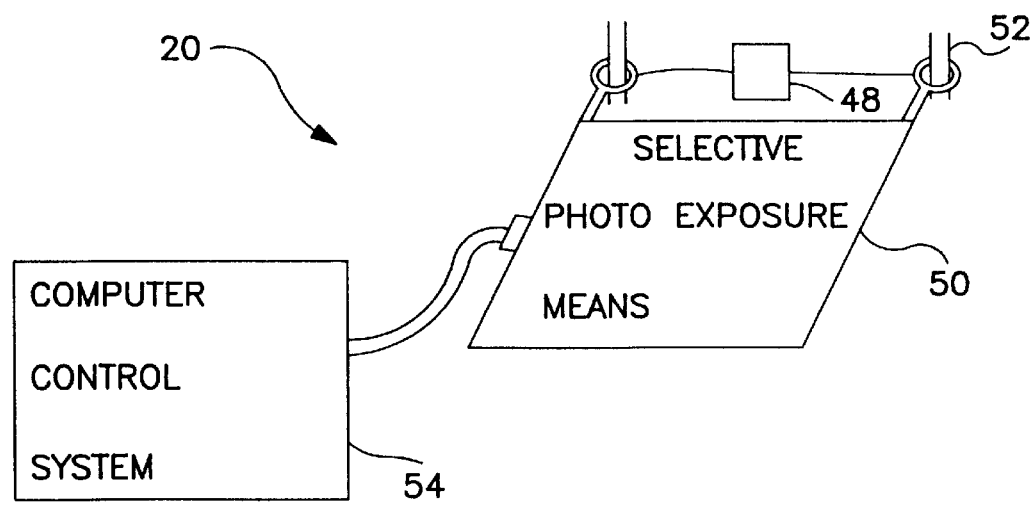
FIG. 2 is an illustration of a system by which a three-dimensional object can be fabricated in accordance with the method of FIG. 1.
Figure 2:
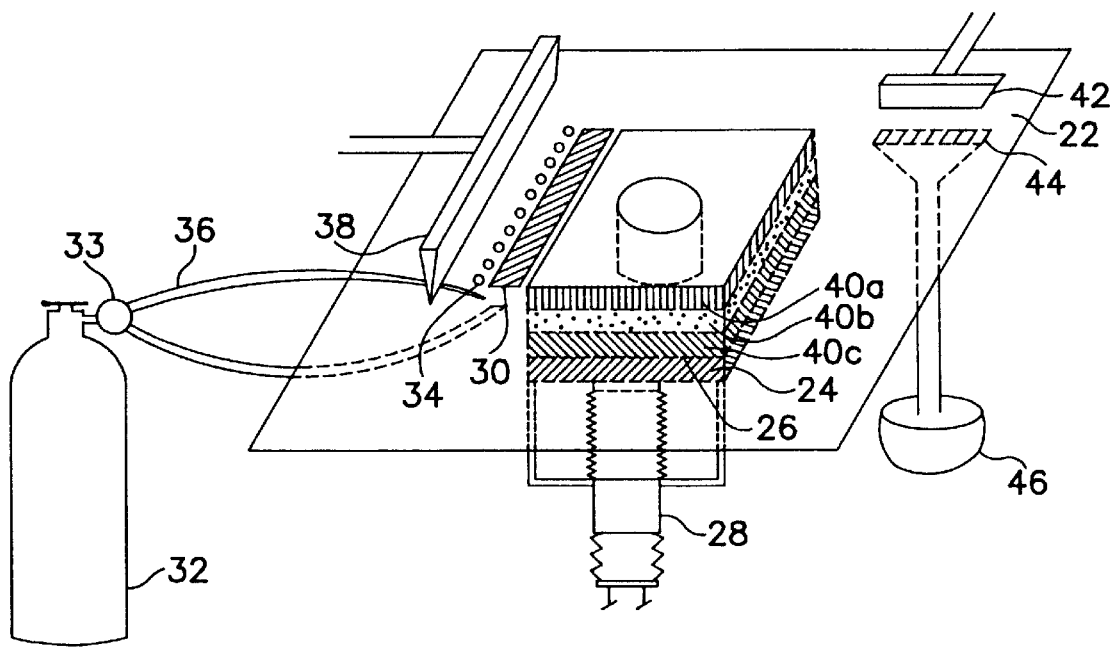

FIG. 2 illustrates a preferred embodiment of a device 20 suitable for implementing the method illustrated and described in the flow chart of FIG. 1. Device 20 generally comprises a work surface 22 having a build table 24 with a superior face 26 that can be displaced vertically byway of an elevator 28, e.g., a stepper motor, or the like. A photopolymerizable build material 30 is dispensed onto work surface 22 from, for example, pressurized tank 32, through valve 33 and then through suitable ports 34 in the work surface. Alternatively, the build material 30 may be routed through valve 33 to conduit 36 and directly to work surface 22. The photopolymerizable composition 30 is applied over the work surface to a predetermined thickness by leveling means 38, e.g., a doctor blade, to form layer 40 on build table 24. A typical layer thickness ranges between 1 mil to 25 mil, preferably between 1 mil to 10 mil. Excess material is optionally removed by action of recovery means 42, e.g., a "squeegee," through drain 44 into recovery vat 46. The leveling means is then raised and vertical positioning means 48, e.g., a pneumatic cylinder, lowers selective photoexposure device 50 held in frame 52. The layer of photopolymerizable composition 30 is selectively exposed to actinic radiation by activating selective photoexposure device 50. Any uncured material is removed, e.g., by aspiration. A solvent, e.g., hexane, acetone, or the like, may be used as an aid to dislodge the uncured material.

Selective photoexposure device 50 preferably comprises a digitally operated exposure device such as a digital micromirror device ("DMD") having a DLP or LCD projector, or a digital light induced amplification device (DLIAD). Such devices are designed to interface with CAD/CAM and STL slice conversion software. The slice information is converted to a cross section image of the layer and light is projected corresponding to those areas of the layer to be photopolymerized. The image projected by the DLP or LCD projector is controlled by computer system 54. DMD for DLP projectors may be obtained, for example, from Proxima (Desktop Projector Model 4100) or InFocus Systems (Lite Pro 620). LCD projectors may be obtained from Proximal (Desktop Projector Model 240) or InFocus Systems (Lite Pro 210).

In another embodiment (not shown), the selective photoexposure device comprises a source of actinic radiation, an LCD panel that serves as an electronic mask, and optical elements as needed to collimate, focus, filter, or otherwise process the radiation that passes through the mask as required. Those skilled in the art will recognize that the optical elements may include various lenses, mirrors, filters, and the like, depending on the source of radiation and the nature of the photopolymerizable build material. The data corresponding to the two-dimensional cross section of the layer is fed to the LCD panel to create an electronic mask, through which actinic radiation passes to solidify selected areas of the photopolymerizable composition as discussed above. The ability of the LCD panel to pass or block the passage of the radiation is controlled by computer system 54. The LCD panel may be one having an active or a passive matrix screen. LCD panels that may be used with the layer-by-layer photofabrication system disclosed herein are commercially available from, e.g., nView Model Z310 (nView, Newport News, Va.).

Figure 3:
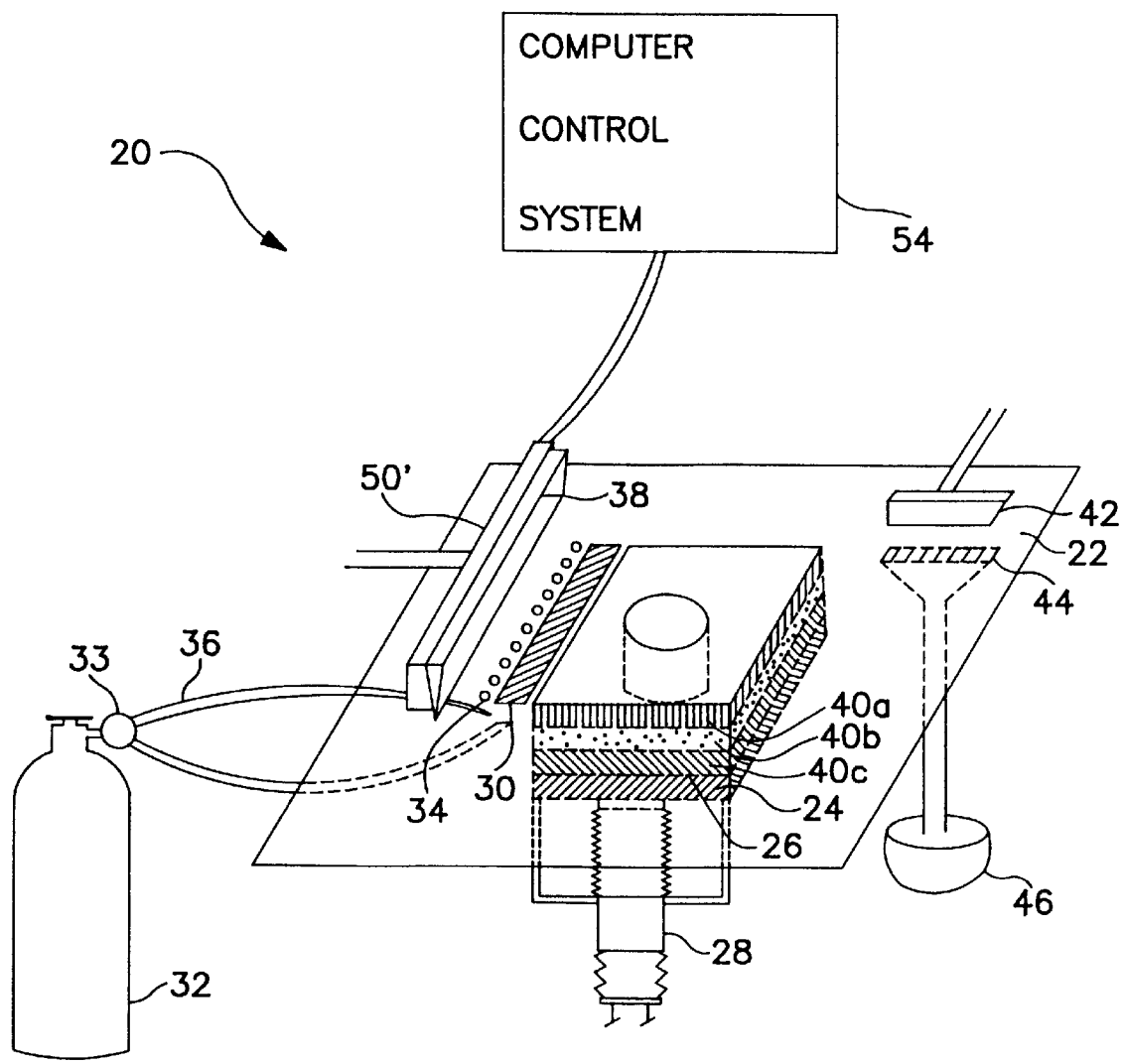
FIG. 3 is an illustration of an alternative system by which a three-dimensional object can be fabricated in accordance with the method of FIG. 1.

In FIG. 3, selective exposure device 50' comprises an optical system for laser scanning. A description of an exemplary optical system for laser scanning may be found in Fisli (1983) Proc. SPIE Int'l Soc. Optical Eng. 390:45–48. Preferably, system 50' is affixed to leveling means 38 in a manner such that as the photopolymerizable build material is applied over the work surface to a predetermined thickness by the leveling means, the optical system is translated over the surface of the layer of photopolymerizable build material. The optical system for laser scanning 50' is loaded with an image of a cross section of the layer to be fabricated from computer 54. The image stored in the laser printer optics system is fed to the laser which serves to selectively expose the composition to radiation, and thereby solidifies those areas of the composition corresponding to the cross section of the object to be formed. The laser is preferably a solid state diode laser which can be used to generate actinic radiation in the near infrared spectrum or, with the use of a frequency doubler, in the visible spectrum. optical systems for laser scanning are available from Xerox Corp. (Palo Alto, Calif.). Solid state lasers that emit in the visible or near IR spectral ranges are available from SDL, Inc. (San Jose, Calif.) or Uniphase (San Jose, Calif.).

A suitable source of actinic radiation is a visible light source or a near infrared light source. The visible light source may be a tungsten-halogen lamp, a xenon arc lamp, e.g., Oriel 1000 Xenon arc lamp, or a visible solid state laser. Near infrared light sources include solid state diode lasers, quartz tungsten-halogen lamps, and the like.

Computer system 54 is used to generate a three-dimensional model of the object to be fabricated. The computer-generated model may be constructed on the computer itself, using CAD/CAM software. In the alternative, the model may be generated from data scanned into the computer from a prototype or from a drawing. The computer is thus used to provide slice information about the various layers of the object and to provide cross section data for each layer that is fed to selective photoexposure device 50. The computer-generated slice information may be provided to selective photoexposure device 50 at any time prior to exposure of the photopolymer to the radiation. Guidance for the selection of appropriate CAD/CAM-and slice-conversion software may be found in Jacobs (1992), supra, chapters 5 and 6, and Burns (1993), supra chapter 6.

Computer system 54 may be any system that is capable of modeling the object to be fabricated, slicing the model into layers having predetermined thickness and providing two-dimensional cross section data about the layer to selective exposure device 50 or the optical system for laser scanning. Examples of such systems have been described in U.S. Pat. No. 4,961,154, supra, U.S. Pat. No. 5,182,715 to Vorgitch et al., the disclosure of which is incorporated herein by reference. CAD/CAM software is available from a number of vendors including, e.g., EDS-Unigraphics (Troy, Mich.), Structural Dynamic Research Corporation (Milford, Ohio), Hewlett-Packard Mechanical Division (Ft. Collins, Colo.), Autodesk (Sausalito, Calif.). STL conversion software for rapid prototyping is available from vendors such as Brock Rooney and Associates (Birmingham Mich.), Imageware (Ann Arbor, Mich.), Solid Concepts, Inc. (Valencia, Calif.), POGO International, Inc. (College Station, Tex.), and the like Computer system 54 may perform a variety of functions in addition to generating the three-dimensional model of the object to be fabricated, the slice information about the layers of the object, and the cross section data for each layer, from which the mask is generated. Computer system 54 may be used to control the operation of elevator means 28, valve 33, vertical positioning means 48, and the like.

When exposure of a layer is complete, selective photoexposure device 50 is returned to an elevated position to allow the application of a new layer of photopolymerizable build material to enable communication of data to the selective photoexposure device for generation of the cross section image of the successive layer. A three-dimensional object is accordingly produced by the step-wise buildup of layers, such as 40a, 40b, and 40c, on build table 24.

The build table 24 is used to support and hold the object during fabrication, and to move the object vertically as needed. Typically, after a layer is formed thereon, the build table is moved down so a fresh layer of photopolymerizable build material may be applied over the just-formed layer. Elevator means 28 can advantageously be capable of programmed movement at an appropriate speed with appropriate precision. The elevator means movement mechanism may be mechanical, pneumatic, hydraulic, or electric, and may include optical feedback to control its position relative to the work surface.

The photopolymerizable component of a photopolymerizable build material may include any uncured liquid, semi-solid or solid that can be cured by actinic radiation, e.g., by visible light, near infrared light, or the like. Examples of such curable liquids, semi-solids and solids are disclosed in UV Curing: Science and Technology, Pappas, ed., Technology Marketing Corp. (Norwalk, Conn.), and Roffey, Photopolvmerization of Surface Coatings, J. Wiley & Sons (Chichester). Photopolymerizable resins are commercially available from, e.g., Applied Polymer Systems, Inc. (Schaumberg, Ill.), Ciba Geigy Corp. (Los Angeles, Calif.), UCB Chemical Corp., Inc. (Smyrna, Ga.), E.I. Du Pont de Nemours & Co. (Wilmington, Del.) and Sartomer (Exton, Pa.).

The polymerizable component may be a monomer, mixture of monomers, oligomers, mixtures of oligomers, or mixture of oligomers and monomers, which can be polymerized and solidified by exposure to actinic radiation such as near infrared or visible light. Suitable photoactive monomers include acrylates, including mono-, di- and tri-acrylates, and mixtures thereof, methacrylates (see, Tu, in UV Curing Science and Technology, Pappas, ed., supra, Chapter 5), epoxides, or epoxide-acrylate formulations, and other visible or near infrared light curable monomers. Examples include 2hydroxyethylacrylate, hexanedioldiacrylate, triethyleneglycoldiacrylate ("TEGDA") diethyleneglycoldiacrylate, tetraethyleneglycoldiacrylate, trimethylolacrylate, and the like.

In one embodiment, a solid or semi-solid photopolymerizable build material may be formulated from a photopolymerizable monomer, or oligomer, or both, mixed with a polymer that is optionally functionalized to have moieties with which the monomer or oligomer may react. Alternatively, the monomer, oligomer, or both may be mixed with a wax. Preferably, the monomer is an epoxide, e.g. Uvecure 1500 (UCB Chemical Corp.), 3,4-epoxycyclohexylmethyl-3,4-epoxycyclohexane carboxylate (Aldrich), or 1,4-butanedioldiglycidylether (Aldrich), or an epoxyacrylate such as EbecrylO 3200 (UCB Chemical Corp). More preferably, the monomer is an epoxide-acrylate blend. The oligomer may be a polyester-acrylate oligomer, such as, Ubecryl® 438, Ubecryl® 584, or Ubecryl® 2047. Examples of waxes that may be incorporated into the photopolymerizable build material include paraffin waxes, microcrystalline waxes, carnuba wax, mineral wax, synthetic waxes, such as polyethylene waxes, and the like (see, Encyclopedia of Polymer Science and Engineering, 2nd ed., vol. 17, pages 784–795).

A semi-solid or solid photopolymer composition is preferably dispensed onto the work table as a hot liquid. As the liquid cools it solidifies. The solidified composition is photopolymerized by exposure to an appropriate wavelength of actinic radiation. When a solid or semi-solid photopolymerizable build material is used, additional support components or structures may or may not be designed into the object.

The photopolymerizable build material may also include a plasticizing solvent. Solvents having plasticizing properties include dibutylphthalate ("DBP"), benzylbutylphthalate, other phthalates, linear or cyclic carbonates such as propylene carbonate and ethylene carbonate, ketones such as cyclohexanone, methylethylketone, and higher homologs, ethers, and the like. Additional optional components that can be included in the photopolymerizable build material may be found in U.S. Pat. No. 4,906,424 to Hughes et al. Optionally, a light-sensitive additive is incorporated into the photopolymerizable build material to reduce the energy necessary to effect photopolymerization. Visible light photoinitiators are generally multicomponent systems including, e.g., a xanthene dye, a first coinitiator such as an iodonium salt, and a second coinitiator. Suitable visible-near IR photoinitiators are described in U.S. Pat. No. 5,451,343 to Neckers et al., U.S. Pat. No. 5,395,862 to Neckers et al., U.S. Pat. No. 4,952,480 to Yamaguchi et al, and U.S. Pat. No. 4,772,530 to Gottschalk et al., De Raaff et al. (1996) RADTECH Conference Proceedings, Chatterjee et al. (1988) J. Am. Chem. Soc. 110:2326–2328, Bi et al. (1994) Macromolecules 27:36833693, and include 3,31-diethylthiatricarbocyanine iodide, 3,31-diethylthiadicarbocyanine iodide, 3,31diethyloxadicarbocyanine iodide, 3,31-dimethyloxatricarbocyanine iodide, 1,3,3,11,31,31-hexamethylindodicarbocyanine iodide, and 1,11-diethyl-2, 21-quinodicarbocyanine iodide, all of which are commercially available (e.g., from Dojindo Laboratories, Japan, or from Spectra Group Limited, Inc., Maumee, Ohio).

Suitable software is used to provide data to the selective photoexposure device for generation of the successive layer cross section images. The selective photoexposure device is linked to a CAD/CAM system and a slice conversion system that are together capable of producing a three-dimensional computer model representation of the object, slicing the representation into a plurality of successive layers having predetermined thickness, producing cross section data of the layers of the object, and providing the cross section data layerwise to the selective exposure device.

The following description outlines the steps in a method for fabricating a three-dimensional object according to a selective deposition aspect of the present invention. This method need not, and generally does not rely on polymerization to cure the build material.

In step 11 (not shown), a computer representation or "model" of the object to be formed is generated using a CAD/CAM software system. This step may advantageously be identical to step 1 of FIG. 1.

In step 12 (not shown), a build materials is applied to either a work surface or to a previous layer. Unlike the mechanics of step 2 of FIG. 1, however, the deposition here is selective—the deposition of the build material in any given layer takes place according to a corresponding pattern derived at least in part from the CAD model. Suitable deposition apparatus are known in the art.

Step 12 also differs from step 2 of FIG. 1 in the nature of the build material. In step 12 it is contemplated that the build material will be provided as a precursor having a first reagent comprising the metal covalently bound to a first ligand, and a second reagent which undergoes a redox reaction with the first ligand. The reagents are prefereably dispensed together as a dispersion of one in the other, and preferably dispensed through a single dispensing head. It will be appreciated, of course, that either the first or second reagents can provide oxidier, with the other reagent providing the reducer. Nevertheless, it is preferred that the first ligand will comprise the reducing agent and the second reagent will comprise the oxidizing agent.

Since considerable heat may be generated in the reaction, it is preferable that the reaction does not take place until initiated with some sort of energy pulse, so that the timing of the reaction can be controlled. In step 13 (not shown), an energy pulse is provided in the form of light, microwaves, or other suitable form. As with other redox reactions it is contemplated that the reaction will be irreversible. In this context irreversibility means that a small change in the reaction conditions will not change the equilibrium of the reaction. Also, it is preferable that the redox reaction will produce a gas that will leave the object being formed.

Presently preferred build materials suitable for the bulk of the product being produced include polymerizable silazane, silane, borazine, borane oligomers, and other preceramic monomers, oligomers or polymers functionalized by polymerizable groups (e.g., vinyl, acrylate, methacrylates, and so on); metal acrylates, metal methacrylates and other polymerizable metal carboxylates; metal carboxylate in the presence of oxidizing species and metal nitrates in the presence of reducing species. Such materials are selected because of their ability to be chemically transformed into ceramics, such as metal nitrides, carbides or oxides, or metals by heating and for some of them, because of their ease of polymerization. These build materials may or may not be used in combination with other curable monomers or oligomers. may or may not be used in combination with other curable monomers or oligomers.

Once again, it is contemplated that a plurality of build materials can be employed together in a given build, either in the same layer or in different layers, to achieve particular functionalities. Among other suitable build materials, it is contemplated that copper formate and gold acetate-isobutyrrate would be particularly well suited for providing an electrical conduction path, silver acrylate and $Pd(CHOCOO)(CH_2OHCOO)$ would be particularly well suited for providing a thermal conduction path, silazanes and silanes would be particularly well suited for providing structural support, and zirconium and aluminum acrylates would be particularly well suited for providing thermal barrier coatings and surface compressive stress properties.

In step 14 (not shown), steps 12 through 13 are repeated to gradually build up the object desired. Again, depending on the number of layers the entire process may take several hours, or even several days, and may involve up to 5000 layers or more.

In step 15 (not shown), the object is removed from the build apparatus and potentially subjected to further processing. Such processing may involve annealing or other heat induced processing, milling, or any other suitable process steps.

Regardless of what type of build material is being employed, it may be advantageous to provide structural support for elements of the object being built as each successive layer of the object is fabricated. Means for providing such support are known in the art, and may be incorporated into the object as it is being fabricated. Such elements may be removed when fabrication of the object is complete. For examples of such support structures, see, Burns, supra, chapter 6, and Jacobs, supra, chapter 6. Any of the means described in these references, or any other means of providing support known to those skilled in the art may be used. When a solid or semi-solid photopolymerizable material, such as a composition containing a wax, is used to fabricate the object, additional support structural elements may or may not be designed into the object.

It is further contemplated to include a high ceramic- or metallic-loading dispersion in a build material. Such dispersions are contemplated to include: a solvent having plasticizing properties such as phthalates, cyclic or linear carbonates, ketones, ethers, and the like; a surfactant or dispersant, such as Hypermer Triton X-100, Brij and the like; polymerizable monomers; and, optionally, a wax, a ceramic material, a metallic material, or a mixture thereof. Ceramic and metal powders are preferably included in a finely divided form, having diameters in the range of from about 0.1 Am to about 50 "m, and more preferably about 0.1 "m to about 1.0 "m. The powder can advantageously be selected so that close packing of the powder particles may be achieved in the dispersion.

Any ceramic or metallic powder that can be formed into finely divided particles can be used in a build material. Examples of suitable ceramic powders include silica, silicon nitride, silicon carbide, boron carbide, titanium carbide, titanium nitride, tungsten carbide, molybdenum oxide, alumina, zirconia, silica, ferrite, and mixtures thereof. Examples of suitable metallic powders include free metals such as aluminum, copper, nickel, iron, magnesium, silicon, titanium, tungsten, mixtures thereof, alloys thereof, such as stainless steel, nickel aluminum, titanium aluminum, and the like, mixtures of alloys thereof, and mixtures of metals and metal alloys.

The following examples are intended to provide those of ordinary skill in the art with a complete disclosure and description of how to make and use various aspects of the inventive subject matter, and are not intended to limit the scope of what the inventors regard as their invention. Efforts have been made to ensure accuracy with respect to numbers used (e.g., amounts, temperatures, etc), but some experimental error and deviation should, of course, be allowed for. Unless indicated otherwise, parts are parts by weight, temperatures are in degrees centigrade, and pressure is at or near atmospheric. All chemicals, reagents, and the like, are commercially available or are otherwise readily synthesized using conventional techniques well known in the art.

EXAMPLE 1

Preparation of Polysilazane (I). Distilled methyldichlorosilane (8.33 mL) and distilled methylvinyldischlorosilane (2.60 mL) were dissolved in anhydrous ethyl ether under argon. This mix was cooled with an external ice bath and to it an excess of liquid ammonia was slowly added dropwise by means of a syringe needle. After the addition was completed, the reaction was warmed up to room temperature and stirred for additional two hours. The ether was then distilled off and the remaining residue was purified by vacuum distillation to yield the desired polymer.

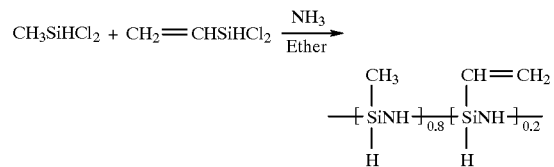

EXAMPLE 2

Preparation of Silicon Nitride Slurry. Polysilazane of Example 1 (115.18 g), triethylenglycoldiacrylate (20.0 g), 470B (Spectra Group Limited Inc., Maumee, Ohio) (0. 98 g), Hypermer KD-1 (11.86 g), 4-octyloxyphenyl phenyl iodonium fluoroantimonate (OPPI) (GE Silicones) (9.2 g), dibutylphthalate (80 g) and 2-methoxyethylacrylate (108.8 g) are mixed into a homogeneous system. To this N,N-dimethyl-2,6-diisopropylaniline (4 g) and silicon nitride powder (650 g) are added, and the slurry is thoroughly mixed by ball milling.

EXAMPLE 3

Multilayer fabrication of Silicon Nitride Tile. The silicon nitride slurry of Example 2 is applied as a thin layers (50 μm each) by means of a doctor blade on a build table. The slurry is selectively cured by photoexposure for ten seconds through a digital micromirror device chip using a 270-watts metal halide lamp. A 3"×3" green ceramic tile with a thickness of 0.25" was built.

EXAMPLE 4

Multilayer fabrication of silicon nitride vane. The silicon nitride slurry of Example 2 is applied as a thin layers (50 μm) by means of a doctor blade on a build table. The slurry is selectively cured by photoexposure through a digital micromirror device chip using a 270-watts metal halide lamp. Upon fabricating multilple layers, a green silicon nitride vane is built. Each layer corresponds to slice images generated from CAD data.

EXAMPLE 5

Multilayer fabrication of a silicon nitride part with surface compression stress layer. Silicon nitride slurry of Example 2 is applied as a thin layers (50 μm each) by means of a doctor blade on a build table. A surface compression stress layer containing aluminum and oxygen is applied by dispensing the silicon nitride slurry containing aluminum acrylate-2-ethylhexanoate on selected area by means of a dispenser head. Each layer is selectively cured by photoexposure to a 270-watts metal halide lamp through a digital micromirror device chip.

EXAMPLE 6

Multilayer fabrication of silicon nitride-silicon carbide composite. The following 10 ceramic slurry is prepared. Silicon nitride(63 g), silicon carbide (7g), pentaerytritol triacrylate (2 g), 2-hydroxyethylacrylate (10.7 g), 3,4-epoxycyclohexylmethyl 3,4-epoxycyclohexanecarboxylate (1.56 g), dibutylphthalte (3g), 470B (0.098 g) OPPI (−0.620 g), DIDMA (0.4 g) and polyvinylcarbosilane (9.64 g) corresponding to the following structure

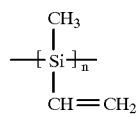

The ceramic slurry is applied as 50 μm thick layers. It is selectively cured by photoexposure to a 270-watts metal halide lamp through a digital micromirror device chip. The exposure time is about 15 seconds and the power is 25 mW/cm$^2$ measured at 470 nm.

EXAMPLE 7

Multilayer Photopolymerization of a Silicon Nitride Slurry using an optical System for Laser Scanning. In this example, the silicon nitride slurry prepared as described in Example 2 is applied as 2 mil-thick layers on a build table, and each layer is photoexposed translating an optical system for laser scanning (Xerox Corp.) over the surface of the layers.

EXAMPLE 8

Multilayer Photopolymerization of a Silicon Nitride Slurry Using an LCD Panel Mask. In this example, the silicon nitride slurry prepared as described in Example 2 was applied as 2 -mil thick layers on a build table and each layer was photoexposed for about 50 seconds through an LCD panel using a 1000 W xenon lamp.

EXAMPLE 9

Fabrication of alumina-silver substrate. An alumina slurry is prepared as follows. Pentaerytritol triacrylate (13.3 g), 3,4-epoxycyclohexylmethyl 3,4-epoxycyclohexanecarboxylate (41.1 g), 2-hydroxyethylacrylate (36.6 g), 470B (Spectra Group Limited Inc., Maumee, Ohio) (0. 65 g) and Hypermer KD-1 (7.91 g) were mixed into a homogeneous system. Separately, 4-octyloxyphenyl phenyl iodonium fluoroantimonate (OPPI) (GE Silicones) (1.57 g) was dissolved in dibutylphthalate (20 g) and 2-hydroxyethylacrylate (78.05 g). The two solutions are mixed together. To this N,N-dimethyl-2,6-diisopropylaniline (0.78 g) and alumina powder (800 g) are added, and the slurry is thoroughly mixed by ball milling. The slurry is applied as thin layer (75 μm thick) and selectively cured by photoexposure to a 270-watts metal halide lamp through a digital micromirror device chip to form a square substrate (5 mm thick) with multiple vias having a diameter of 250 lm each. A solution of the silver precursor was prepared from silver acrylate (1 g) dissolved in 15 mL of 3-picoline by heating at 70–80° C., and filtered through a 0.2 μm microfilter. The solution is applied by an ink-jet nozzle along the walls of the vias. The whole substrate is cofired first at 450° C. then at 1200° C. the yield a dense alumina plate with multiple vias coated by silver metal.

EXAMPLE 10

Multilayer fabrication of a surface acoustic wave device. Lead acrylate (37.08 g), zirconium acetate (22% in water) (38. 3 g), and titanium acetylacetonate (16% in isopropyl alcohol) (24.62 g) are mixed together. To this solution nitric acid, pentaerytritol triacrylate (10.5g), 470B (0.12g), 4-octyloxyphenyl phenyl iodonium fluoroantimonate (1.06 g), N,N-dimethyl-2,6-diisopropylaniline (0.48 g), Triton X-100 (5 g) and lead zirconate titanate powder (124 g) are added. The slurry is applied as thin layers (50 μm thick) with a doctor blade and each layer is photoexposed for twenty seconds through a DMD array using a 270-watts metal halide lamp. Ten layers are fabricated. A solution of a silver precursor, prepared as describd in Example 9, is ink-jet printed on the top layer of the lead zirconate titanate slurry in the form of interdigitated electrodes. The whole substrate is cofired first at 350° C. followed by pyrolysis and annealing at 650° C.

EXAMPLE 11

Multilayer fabrication of indium tin oxide substrate. Tin isopropoxide (8.85 g), indium nitrate (0.88 g), and indium acrylate (5.4 g) are dissolved in formamide (15 mL). To this solution nitric acid (13.6 mL), pentaerytritol triacrylate (4.5 g), 470B (0.05g), 4-octyloxyphenyl phenyl iodonium fluoroantimonate (0.2 g), N,N-dimethyl-2,6-diisopropylaniline (0.06g) and indium tin oxide powder are added. The slurry is applied as thin layers (50 μm thick) with a doctor blade and each layer is photoexposed for twenty seconds through a DMD array using a 270-watts metal halide lamp. Ten layers are fabricated.

Thus, specific embodiments and applications of methods for preparing mixed metal oxides have been disclosed. It should be apparent, however, to those skilled in the art that many more modifications besides those already described are possible without departing from the inventive concepts herein. The inventive subject matter, therefore, is not to be restricted except in the spirit of the appended claims.

We claim:

1. A method for fabricating a three-dimensional object, comprising:

providing a CAD model of the three-dimensional object;

providing a build material containing a metal having a covalent bond to a non-metal;

depositing the build material in successive layers;

at least partially curing the build material in each of the successive layers according to corresponding cross-sectional patterns derived at least in part from the CAD model; and processing the layers to produce the three-dimensional object at least in part through a chemical reaction which alters the covalent bond.

2. The method of claim 1 wherein the metal in the build material is bound to a polymer precursor.

3. The method of claim 2 further comprising polymerizing the precursor to produce a polymer.

4. The method of claim 3 further comprising a most recent layer, and wherein the step of polymerizing the precursor comprises directing light energy onto the most recent layer.

5. The method of claim 3 wherein the polymer includes an organic component, and further comprising applying energy to the polymer to volatilize the organic component.

6. The method of claim 5 wherein the step of applying energy at least partially drives the chemical reaction.

7. The method of claim 5 wherein the step of applying energy comprises heating the polymer.

8. The method of claim 1 wherein the chemical reaction is irreversible.

9. The method of claim 1 wherein the chemical reaction produces a substantially pure form of the metal.

10. The method of claim 1 further comprising providing a ligand, and wherein the chemical reaction produces a compound in which the metal is covalently bound to the ligand.

11. The method of claim 10 further comprising:
chemically coupling the metal in the build material to a first polymer precursor; and
chemically coupling the ligand to a second polymer precursor.

12. The method of claim 10 further comprising:
chemically coupling both the metal and the ligand to a polymer, and
applying energy to the polymer to at least partially drive the chemical reaction.

13. The method of claim 1 further comprising:
providing the build material as a precursor having a first reagent comprising the metal covalently bound to a first ligand, and a second reagent which undergoes a redox reaction with the first ligand.

14. The method of claim 13 wherein the first ligand comprises a reducing agent and the second reagent comprises an oxidizing agent.

15. The method of claim 13 further comprising:
initiating the redox reaction by applying heat to one of the layers before depositing another of the layers.

16. The method of claim 13 wherein the first ligand is selected from the group consisting of nitrate, a nitrite, and a perchlorate.

17. The method of any of claims 1–15 wherein the chemical reaction produces a product within the group consisting of a high dielectric material, a ferroelectric material, a fuel cell material, a hybrid electric ceramic, a conductive oxide and an electrochromic oxide.

18. The method of any of claims 1–16 wherein the chemical reaction produces a product within the group consisting of silicon nitride, silicon carbide, boron carbide, titanium carbide, titanium nitride, tungsten carbide, molybdenum oxide, alumina, zirconia, silica, ferrite, and mixtures thereof.

19. The method of any of claims 1–16 further comprising:
providing the build material in at least two formulations; and
selectively depositing the at least two formulations to produce a functional non-uniformity within the three-dimensional object.

20. The method of claim 19 wherein the functional non-uniformity is selected from the group consisting of an isotropic conductor, an electrical conduction path, a thermal conduction path, a structural support, and a thermal barrier.

21. The method of any of claims 1–16 wherein the step of at least partially curing the build material is selected from the group consisting of laser sintering, polymerization of a monomer, and sterolithography.

22. The method of any of claims 1–16 wherein the step of at least partially curing comprises selectively photoexposing the build material using a digitally operated selective photoexposure device.

23. The method of any of claims 1–16 wherein the step of at least partially curing comprises selectively photoexposing the build material using visible light.

24. The method of any of claims 1–16 further comprising providing at least one of the layers as a surface compressive stress layer.

25. The method of any of claims 1–16 further comprising providing at least one of the layers with a different coefficient of thermal expansion than at least another one of the layers.

* * * * *